Feb. 4, 1947.  G. DAVENPORT  2,415,125
SHAPING MACHINE TRANSMISSION
Filed Aug. 21, 1945  2 Sheets—Sheet 1

INVENTOR
Granger Davenport
BY Albert F. Nathan
ATTORNEY

Feb. 4, 1947.  G. DAVENPORT  2,415,125

SHAPING MACHINE TRANSMISSION

Filed Aug. 21, 1945  2 Sheets-Sheet 2

INVENTOR
Granger Davenport
BY Albert F. Nathan
ATTORNEY

Patented Feb. 4, 1947

2,415,125

UNITED STATES PATENT OFFICE 2,415,125

SHAPING MACHINE TRANSMISSION

Granger Davenport, Montclair, N. J., assignor to Gould & Eberhardt, Incorporated, Irvington, N. J., a corporation of New Jersey Application August 21, 1945, Serial No. 611,792

5 Claims. (Cl. 74—342)

The present invention relates to machine tool transmissions and is concerned more particularly with improvements in the change speed mechanisms of shaping machines, and the like, wherein the drive is subjected to variable intermittent loading.

A primary aim of the invention is to provide a quiet running gear transmission for machines of this class, using helicoidal change speed gearing, having the capacity of producing as many as sixteen different speeds with but four pairs of gear teeth in engagement at any one time.

A further aim of the invention is to overcome the difficulties inherent in the use of helicoidal gearing in a change speed mechanism, such as the tendency of sliding gears to ride out of mesh when under load, and the need of auxiliary mechanisms, in the way of complex gear shifting devices and locks to hold the gears in operating position. As an additional objective, this invention undertakes to render available a shaper drive change-speed mechanism in which the gear shifting forks are relieved of the duty of holding the sliding gears in meshed relation after being shifted to one or another effective position.

In carrying out the objectives of this invention it is now proposed to construct the entire shaper driving and change-speed mechanisms with helicoidal gears and incorporate therein 3 speed change sets, in series arrangement. The primary set, yielding 2 speeds, the secondary or the transmission set yielding 4 speeds, and the tertiary or back-gear set yielding 2 speeds, making a total of 16 different speeds available.

In the present embodiment of the invention the first and second speed change sets involve power transmission principles as concerns two shafts, whereas, the third (back gears) involve power transmitting principles as concerns three shafts. In the latter situation, the intermediate gear of the conventional helical gear train if a single gear, is in kinetic balance, and if it is double or compound, can be kinetically balanced in the manner disclosed in the patent to Zimmermann No. 2,077,730.

The principle of balancing the end thrusts in the intermediate compound helical gear unit of a three-shaft drive, cannot be applied to a situation wherein the power is transmitted between two shafts, for in any two-gear helical drive there is always produced an end thrust in one direction in one gear, and an end thrust in the opposite direction in the other. The magnitude of the end thrust is a function of the helix angle of the gear and its tooth load and the direction of the thrust will depend on the hand of the helix, the direction of gear rotation, and whether the gear in question is driving or being driven.

Heretofore it has not been found feasible or practical to employ helical gears in a shaper change speed transmission mainly because of difficulty in taking helical gear thrusts through a shifter fork or equivalent and the consequent difficulties in shifting. By this invention, however, the difficulties inherent in helical gear change speed mechanisms have been eliminated in a manner whereby the end thrust in a shiftable helical gear is taken by sturdy non-shiftable abutments and bearings of the machine, the shifting forks, etc., being relieved entirely of that duty. In accomplishing the results envisaged, this invention proposes a shaper drive transmission, wherein each shiftable element of the drive is constructed as a compound gear having but three positions, i. e., neutral, right effective, and left effective. At the extremes of shift of the compound gear, positive abutments are provided that definitely prevent movement of the gear, in an axial direction, beyond those points. Additionally, each gear of the compound shiftable unit, is made so that its tooth helix progresses in a direction opposite to the other, and is given a set that, with regard to the function of the gear and its direction of rotation, the end thrust developed therein will be toward the adjacent positive abutment when the gear is at one limit of its shift (one effective position) and toward the other positive abutment when the gear is at the other limit of its shift (its other effective position). By so developing a transmission whereby the extremes of the aforesaid left and right shift movements are the fully engaged positions with companion gears of a train, the end thrusts on the gears will be in the direction opposed to disengagement, regardless of which gear of the unit is functioning at the time as the driver. More specifically, if the gears of the compound helical gear unit have their tooth helices oppositely angled and related to cooperate with the respective opposite abutments, the duty of holding the unit in either of its operating positions is taken away from the shifting fork and reposed in the gear or gears themselves.

In a drive so constructed, the helix angle of the gear teeth must be relatively low to avoid counter thrusts and back slapping of the gears on ram reversals and by using low angles oppositely set and related with regards to the position and function of each gear in the train, a quiet and smooth running, self-retaining and easily shifted transmission, eminently suited to shaping machine usage, is provided. Moreover, the need for heavy complex shifters is eliminated and a simpler, more sensitive, and more easily operated gear shifting mechanism, has with this invention, been made possible.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1:
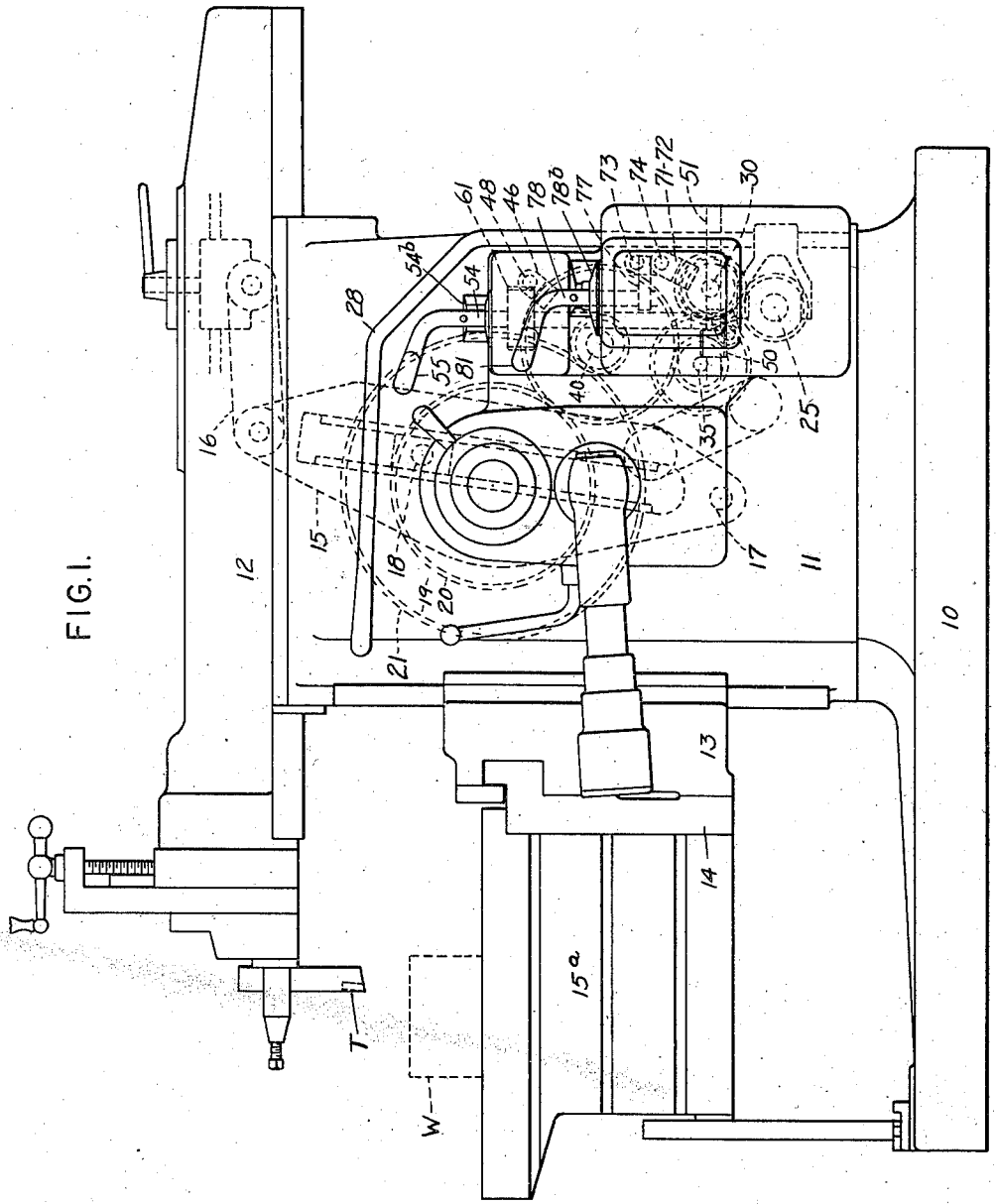
Figure 1 is a side view of a shaping machine embodying the invention.

Referring more particularly to Figure 1, the shaping machine illustrated comprises a base member 10, from which rises a main frame 11 that supports, in V-guides along its top, a reciprocable ram member 12. To the front of the main frame a vertically adjustable saddle member 13 is mounted and which carries a horizontally movable cross-slide 14. The slide 14, in turn, supports a work table 15$^a$ that carries the workpiece W to be machined by a tool T carried at the forward end of the ram 12. As will be understood the ram is reciprocated by power, and between strokes, the work is shifted laterally. The power for lateral intermittent feed movements is taken off the ram reciprocating mechanism and is, therefore, always in synchronism therewith. Intermittent feed mechanisms for that purpose are well known, as evidenced by the patent to Zimmermann No. 1,960,565, and need not be explained herein in great detail.

Within the main frame is pivoted a pitman lever 15 whose upper end is pivoted to a draw link 16 which, in turn, is adjustably connected to the ram 12. When, therefore, the pitman is oscillated about its fixed pivot 17, the ram is caused to reciprocate. The pitman is slotted longitudinally and receives a radially adjustable crank pin element 18 that is carried by a large compound gear bull wheel 19 having gears 20 and 21. The bull wheel is journaled in a massive bearing in the main frame, cantilever fashion, and the pitman lever 15 is adapted to sweep across the inner face thereof. As illustrated more clearly in the developed diagram (Fig. 2), the power for rotating the bull gears 20 and 21 enters the machine via a main drive shaft 25. A loose drive pulley 26 and a plate type clutch 27, of conventional design, afford a means for starting and stopping the main drive. The clutch 27 is actuated by a master control lever 28, located at the operator's side of the machine.

Figures 2, 3, 4:
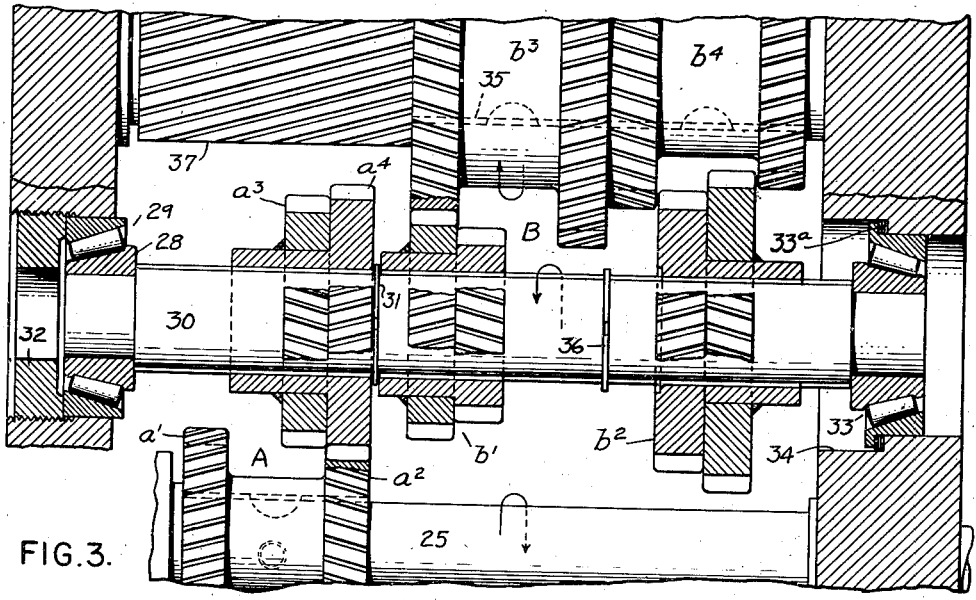
Fig. 2 is a sectional view, in developed form, illustrating more clearly the drive gearing and gear shifting mechanisms of the machine shown in Fig. 1.
Fig. 3 is an enlarged view of portions of a helical gear speed-change mechanism and its mounting means.
Fig. 4 is a detail sectional view of the tooth portions of a pair of mating gears in disengaged position.

As illustrated more clearly in Figs. 2 and 3, of the drawings, the power introduced into the shaft 25 is transmitted to a shaft 30 through a change-speed mechanism A which affords two primary changes in speed. From shaft 30, the power is transmitted to a shaft 35, through a secondary speed change mechanism B, referred to as transmission gears, which affords four additional speed changes. And from the shaft 35, the power is transmitted to the bull wheel of the shaper through a tertiary change speed mechanism C, referred to also as back gears, which afford two further speed changes, making a total of sixteen selective speeds. In the instant embodiment, the range covered by the sixteen speeds is from 15 to 240 ram strokes per minute, with an average differential of approximately 19% between the changes.

Referring to the primary change speed mechanism A, the driving gears $a^1$ and $a^2$ are formed as a cluster gear unit which is securely mounted upon the main drive shaft 25. The gears $a^1$, $a^2$ are, respectively, meshed by complemental driven gears $a^3$, $a^4$, that are slidably splined upon the shaft 30 which parallels the main drive shaft 25. The driving gears $a^1$, $a^2$ are spaced apart sufficiently to accommodate therebetween both of the driven gears $a^3$, $a^4$ to provide an intermediate neutral position in the course of shifting the latter unit from an effective position where gear $a^4$ meshes with gear $a^2$ to its other effective position where gear $a^3$ meshes with the gear $a^1$. The gearing is so designed that the axial shifting of the sliding unit is definitely limited to one position to either side of its neutral or intermediate position by non-shiftable abutments. The abutments comprise, on the one side, the inner rotatable race 28 of an antifriction thrust bearing 29 that journals the shaft 30, and on the other side, a flanged lock ring 31 that seats in an annular groove formed in the shaft 30. The outer race of the thrust bearing 29 is backed up and supported in the frame by a threaded collar 32. The opposite end of the shaft 30 is similarly journaled in antifriction thrust bearing 33 that seats in a flanged recess 34 formed in the main frame. Both ends of the shaft 30 shoulder against the inner races of the respective thrust bearings. By loosening the adjustable collar 32 and shimming up as at 33$^a$ (Fig. 3), behind the thrust bearing 33, the endwise position of the shaft 30 may be precision determined and thereafter held securely against endwise movement.

In accordance with this invention, the gears of the change speed set A are helical gears, having teeth set respectively left and right hand on the driving gears $a^1$ and $a^2$, and right and left hand on the driven gears $a^3$ and $a^4$, respectively. In this instance the driven gear unit comprising gears $a^3$ and $a^4$ is slidable. The main power shaft 25, when the main clutch is engaged, turns clockwise (right handed) viewed from the pulley end, and the helix of the driving gear $a^2$ thereon is set right-hand and the driving gear $a^1$ has its helix set left hand. The driven gears $a^3$ and $a^4$ are also oppositely angled, but reversely to the driving gears because of the parallel axes of the driving and driven shafts. In consequence of this particular helical set of the gear teeth, the axial or end thrust produced in the sliding unit when gear $a^4$ is transmitting the power, is toward the right (as viewed in Fig. 3), and directly against the rotating shoulder or flanged abutment provided by the ring 31. And when the slidable unit is shifted to its other extreme effective position wherein gear $a^3$ is transmitting the power, the axial thrust is toward the left (as viewed in Fig. 3) and against the rotatable abutment provided by the inner race 28 of the thrust bearing 29. There is, therefore, no tendency of the shiftable gear of the change speed set, to be urged out of engagement when under load, in either effective position, and the thrust on the shifting mechanism is correspondingly reduced to practically zero. For convenience in manufacture the gears $a^3$ and $a^4$ are separately cut and the former welded or otherwise secured to the latter.

With regard to the secondary speed change mechanism B, the four speed changes are effected by two slidable double-gear units $b^1$ and $b^2$ splined on the shaft 30, and complemental sets of cluster gears $b^3$ and $b^4$ that are non-slidably splined on the shaft 35. Each of the slidable units $b^1$, $b^2$ has three positions, left effective, intermediate or neutral, and right effective, and the complemental units $b^3$ and $b^4$ have their respective gears spaced in conformity. As with the gears of the primary set, the sliding gears of the secondary set have their extremes of movement definitely limited by non-shiftable abutments, i. e., the inner race of thrust bearing 33, the opposite faces of a lock ring 36 located between the units $b^1$ and $b^2$, and one face of the lock ring 31 previously mentioned. Each sliding unit may, of course, have its own abutments, in the form of rings, bearings, or shoulders on the shaft, etc., but in the interest of connserving space and to simplify the construction and operation it has been found practical to employ only the two outer thrust bearings and two lock rings positioned as illustrated, to provide the necessary six abutments for the opposite extremes of shift of the three independently shiftable change-speed gear units.

Each of the two gears of each shiftable unit $b^1$ and $b^2$ of the secondary change-speed set B, are helical gears and have the teeth of their respective gears set at opposite angles, and being driving gears on a counterclockwise running shift (as viewed from the pulley side of the machine), are set (starting with the gear nearest the pulley side and progressing toward the operator's side) right-hand, left-hand, right-hand, and left-hand. The set of the teeth of these shiftable units are, it will be observed, directionally opposite the set of the teeth of the shiftable gears $a^3$, $a^4$ of the primary set because the former function as driving, and the latter, as driven elements. The complementary gears of the non-shiftable units $b^3$ and $b^4$ have their teeth oppositely angled in conformity with the set of the teeth of their respective drivers, with the result that when either of the shiftable units of change-speed set B, is shifted to its right or left effective position the end thrust reacts in a direction tending to hold the shiftable gear in mesh, and against its limiting abutment. It will further be observed that the end thrust produced in the shaft 30, tend, under certain conditions, to be cancelled out. That is, when the thrust produced by the helical gears of the primary set reacts directionally opposite to the thrusts produced by one of the units of the secondary speed change set, the algebraic sum of the end thrusts is reduced to a minimum and corresponding savings in power and wear on the bearings is realized.

The shaft 35 of the secondary speed change B, has cut thereon a wide face helical gear 37 that is continually meshed by an intermediate gear 38 of a shiftable unit 39. A second gear 41 forms a part of the shiftable unit 39 and which, together with the bull gears 20 and 21 constitute the third or back-gear change speed mechanism C. When the unit 39 is shifted to the right (in Fig. 2) along its shaft 40, any one of the eight selective speeds of the shaft 35, is transmitted through gears 37, 38, and 20, and the axial thrusts in gear 39 are in balance. When the unit 39 is shifted to the left, the power is transmitted through gears 37, 38, 41, and 21, (providing 8 additional speeds). In the latter position the axial thrusts in the unit 39 would be out-of-balance, if the helical angles of all of the gears are the same. However, by determining the angle of the helix of the teeth of the gear 41 with due regard to its tooth load and size relative to the gear 38, as taught in the patent to Zimmermann No. 2,077,730, the end thrusts in the shiftable intermediate compound gear unit 39 can be balanced in each of its effective positions.

The shifting of the gears of the aforementioned three serially related change-speed mechanisms is effected, in the instant embodiment, with two levers, each independently controlling the positions of two of the shiftable units. Referring first to the shiftable units of the primary and tertiary speed change mechanisms, each unit thereof is straddled by a shifter fork 45 and 46 respectively, fixed to rectilinearly movable rods 47 and 48 that are supported in bearings provided by the main frame. The outer end of the rod 47 has rack teeth 49 formed thereon which mesh with the teeth of a pinion 50 that is pinned to a transverse shaft 51. The shaft 51 also has gear teeth 52 formed thereon which continually mesh with annular rack teeth 53 formed upon a vertically extending shaft 54. Axial movement of the vertical shaft 54 will through the mechanisms described effect shifting of the slidable gear unit $a^3$, $a^4$ laterally.

The vertical shaft 54 is adapted to be actuated by its handle portion 55, and is normally constrained in shifted position by ball detent means 56.

The back-gear shifter shaft 48 has rack teeth 60 thereon which mesh with a wide face pinion 61 likewise carried by the vertical shaft 54. Thus, angular movement of the handle 55 effects shifting of the back gear unit 39, ball detent means 62 being provided as combined locating and holding means, and vertical movement of the handle 55 effects shifting of the unit $a^3$, $a^4$ of the primary change-speed set. By so arranging the parts, either slidable unit may be shifted without disturbing a previously set position of the other. A spring 57, operating between the gear 61 on the shaft and a portion 59 of the main frame, yieldingly takes the weight of the shaft 54.

The gears of the secondary change-speed mechanism B are shifted in a somewhat similar manner. Each unit $b^1$ and $b^2$ thereof is straddled by a shifter fork 71 and 72 mounted upon rectilinearly movable shafts 73 and 74, respectively. The shafts 73 and 74 are positioned one above the other and their adjacent sides notched out, as at 75 and 76, near their outer ends. An angularly movable lever 77 carried by a rotatable and vertically shiftable control shaft 78, is adapted to engage the notched portions of the rods 73 and 74, alternately. When each shifter rod is in an intermediate position, as determined by ball detent means 79 and 80, the notched portions of the rods are aligned and the lever 77 may be moved vertically from one slot to the other.

Angular movement of the lever by means of its handle 81 will thereafter effect a lateral shifting of one of the shifter rods and the gear unit controlled thereby. The spacing of the shifter rods 73 and 74 is such, however, that the lever 77 cannot be disengaged from either shifter rod until that rod is returned to its neutral position. This interlocking of the shifters, prevents attempting the shifting of both slidable units b¹ and b² to effective positions simultaneously.

Each of the shifter control shafts 54 and 73 is provided with a radially extending pointer 54ª and 78ª respectively, which in cooperation with circular dial plates 54ᵇ and 78ᵇ giving the various speeds, enables the operator quickly to obtain proper vertical angular positions of the two controls necessary in selecting any of the sixteen ram speeds available with a mechanism of this character and directly to obtain a selected speed without progressively shifting through any of the intermediate steps.

It will be noted that the gear shifting forks and their actuators do not, with compound helical gear units constructed and related as herein disclosed, carry any appreciable portion of the thrust resulting in the respective shiftable units, such end thrusts being taken by rotatable abutments, and consequently the need for complicated, massive shifting mechanisms and locking devices is eliminated. Heretofore, the use of helical gearing in a change speed mechanism has been avoided as impractical because of inability successfully to provide for gear thrust. However, in the present embodiment of this invention in which relatively low angle helical gears are employed, the tendency of sliding gears to jump out of mesh at the ends of the strokes of the ram and before the reversal in motion occurs, is eliminated. Unlike other machine tool drives, a shaping machine transmission is subjected intermittently to the shock of overcoming the inertia of the ram at the end of the forward and return movements thereof, as well as suddenly to pick up the load and start the ram travel anew in the respectively opposite directions. If the helix angle is relatively high, for example above 25°, the back slap becomes objectionable, and if the helix angles are too low, e. g., below 10°, the advantages of helical gearing begin to disappear. It has been found, however, that a helix angle, in and for the gear teeth of a transmission for shapers, of the order of 15° works out very well from all aspects. All the advantages of helical gearing are retained, i. e., progressive tooth engagements and more than one tooth under load at any one time which promotes quietness and smoothness in the drive, plus the further advantages of ease in shifting helical gears into and out of mesh when the power clutch is disengaged, and the absence of back-slap on ram reversals. By chamfering the leading ends of the teeth of mating gears, such as illustrated by the beveled ends 90, 90ª in Fig. 4, additional assurance of ease in shifting the gears into their effective positions is had.

For the purpose of the foregoing description, the expression right hand helix will be understood to mean one that progresses about the surface of a cylinder in a right hand direction, assuming that the cylinder is vertically disposed and the trace proceeds from the bottom toward the top thereof. Right hand turning will be understood to mean a clockwise rotation about a center when looking down on and in the direction of the axis of rotation of the gear. If the gear is viewed from its side (at the tooth face) and its axis is horizontal, the expression right hand turning is to mean that the bottom portion of the gear is "coming" and the top "going." Axial thrust or end thrust toward the right or toward the left, will be understood to mean the movement or tendency to move in those directions assuming the axis of the gear to be disposed in a horizontal plane and the view point is in the same plane and normal to the axis of the gear. It will be further understood that the opposite term "left" as used herein means directions opposite to those above discussed in connection with the term "right."

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, I claim as new and desire to secure the following combinations and elements, or equivalents thereof, by Letters Patent of the United States:

1. In a helical gear mechanism embodying at least one two-gear shiftable helical gear unit, means for relieving the shifting fork associated with the shiftable unit of end thrusts resulting in the transmission of power, combining a pair of non-shiftable helical gears, each having helical teeth thereon with their respective helices extending in opposite directions, and helical teeth on the gears of said shiftable unit, said latter named helical teeth being directionally oppositely disposed on the respective gears thereof, means for limiting the extremes of shift of the shiftable unit, said helical disposition of teeth of complementary pairs of gears being directionally disposed to effect an end thrust on the shiftable unit acting in the direction of said limiting means at each extreme of shift of the shiftable unit, and means including said shifting fork to shift said shiftable gear unit selectively to either of its extremes.

2. A helical gear change speed mechanism comprising a set of non-shiftable helical gears, a set of complementary shiftable helical gears, a thrust bearing at each extreme of shift of said set of shiftable gears, each of said sets of gears consisting of two gear wheels having oppositely angled helical gear teeth thereon, the angular relation of the teeth of complementary gears of each of said sets being disposed to effect an end thrust on the shiftable gear set reacting in the direction of one of said thrust bearings when the shiftable gears are at one extreme position of shift and in the direction of the other of said thrust bearings when the shiftable gears are at the other extreme position of shift.

3. A gear transmission comprising a pair of helical toothed driving gears and a pair of helical toothed driven gears mounted on parallel shafts, the gears of each of said pairs having their teeth set at a helical angle of approximately 15° and the set of one of the pair being opposite to the set of the other of said pair, means mounting the gears of one of said pairs normally in straddled relation with the gears of the other pair, means mounting one of said pairs for axial movement in opposite directions along its shaft to bring one of the gears thereof into and out of mesh with one of the gears of the other pair selectively or to bring the other of said pair into and out of mesh with the other of said other pair selectively, means for shifting the gears of the axially movable pair, non-shiftable abutment means at each side of the axially movable pair of gears operative to limit the extent of axial movement thereof in opposite directions to the effective meshed positions, and means comprising the helical disposition of the teeth of the gears of the shiftable pair to maintain each gear of said pair selectively in each of its shifted and effective meshed positions.

4. A helical gear change-speed gear transmission comprising a non-shiftable set of helical gears, and a shiftable complementary set of helical gears, said shiftable gears having a neutral position and an effective position to the right and to the left thereof respectively, abutment means at the right limit of shift of said gears, and abutment means at the left limit of shift of said gears, and oppositely angled helically disposed gear teeth on said shiftable gears.

5. A change speed transmission comprising a driving shaft, a driven shaft, and an intermediate combined driving and driven shaft, a compound gear on said driving shaft and a compound gear on said driven shaft, a pair of compound gears independently slidable on said intermediate shaft adapted to coact with said first named compound gears, abutment means for limiting the extremes of shift in opposite directions of each of said pair of shiftable compound gears, and oppositely angled helically disposed gear teeth on each of said compound gears, the set of the teeth on the slidable compound gears being related as to produce an end thrust in each of the slidable gears reacting in the direction of said limiting means in each oppositely shifted position of the slidable gears, and whereby, in at least one effective position of the two slidable compound gears, the end thrust produced by one of the compound gears reacts oppositely to the end thrust produced by the other compound gear, and means for shifting said slidable gears.

GRANGER DAVENPORT.

REFERENCES CITED

The following references are of record in the file of this patent:

UNITED STATES PATENTS

| Number | Name | Date |
|---|---|---|
| 2,335,797 | Schreiber et al. | Nov. 30, 1943 |
| 2,077,730 | Zimmermann | Apr. 20, 1937 |

FOREIGN PATENTS

| Number | Country | Date |
|---|---|---|
| 734,291 | French Daimler-Benz | July 26, 1932 |